United States Patent
Shinagawa et al.

(10) Patent No.: US 8,676,470 B2
(45) Date of Patent: Mar. 18, 2014

(54) MULTICYLINDER ENGINE AND METHOD FOR CONTROLLING THE SAME

(75) Inventors: Tomohiro Shinagawa, Shizuoka-ken (JP); Youhei Hosokawa, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 204 days.

(21) Appl. No.: 12/410,827

(22) Filed: Mar. 25, 2009

(65) Prior Publication Data

US 2009/0248277 A1 Oct. 1, 2009

(30) Foreign Application Priority Data

Mar. 25, 2008 (JP) ................................. 2008-077900

(51) Int. Cl.
*B60T 7/12* (2006.01)
*G05D 1/00* (2006.01)
*G06F 7/00* (2006.01)
*G06F 17/00* (2006.01)
*F02D 13/06* (2006.01)
*F02D 17/02* (2006.01)
*F02D 7/00* (2006.01)

(52) U.S. Cl.
USPC ........................ 701/103; 123/198 F; 123/481

(58) Field of Classification Search
USPC ........ 123/198 F, 325, 332, 481; 701/103, 112
See application file for complete search history.

(56) References Cited

U.S. PATENT DOCUMENTS

| | | | | |
|---|---|---|---|---|
| 4,172,434 A | * | 10/1979 | Coles | 123/481 |
| 6,546,910 B2 | * | 4/2003 | Tanaka et al. | 123/348 |
| 6,988,487 B2 | * | 1/2006 | Oono et al. | 123/447 |
| 7,331,332 B2 | * | 2/2008 | Baumann et al. | 123/481 |
| 7,363,915 B2 | * | 4/2008 | Surnilla et al. | 123/481 |
| 2001/0013330 A1 | * | 8/2001 | Grizzle et al. | 123/295 |
| 2004/0177836 A1 | * | 9/2004 | Hasler et al. | 123/481 |
| 2004/0206072 A1 | * | 10/2004 | Surnilla et al. | 60/285 |
| 2005/0193987 A1 | * | 9/2005 | Doering | 123/479 |
| 2005/0193988 A1 | * | 9/2005 | Bidner et al. | 123/481 |

(Continued)

FOREIGN PATENT DOCUMENTS

| | | |
|---|---|---|
| JP | 07217461 | 8/1995 |
| JP | 2001041084 A | 2/2001 |

(Continued)

OTHER PUBLICATIONS

Office Action in corresponding Japanese Application No. 2008-077900 dated Nov. 15, 2011 with partial translation; 6 pgs.
Office Action in corresponding Japanese Application No. 2008-077900 dated Aug. 31, 2011; 4 pgs.

*Primary Examiner* — Stephen K Cronin
*Assistant Examiner* — Sizo Vilakazi
(74) *Attorney, Agent, or Firm* — Gifford, Krass, Sprinkle, Anderson & Citkowski, P.C.

(57) ABSTRACT

In some cylinder deactivation modes (e.g. virtual V-four operation mode in which two cylinders of a V-six engine are deactivated), ignition/combustion may take place in operating cylinders at uneven intervals. In this case, the output torque varies between the immediately subsequent operating cylinders after the deactivated cylinders in the firing order and the other operating cylinders. A multicylinder engine includes an ignition timing adjustment unit. When the ignition takes place in the operating cylinders at uneven intervals during cylinder deactivation, the ignition timing adjustment unit adjusts ignition timing in each of the operating cylinders to smooth the output torque of the operating cylinders.

12 Claims, 3 Drawing Sheets

(56) References Cited

U.S. PATENT DOCUMENTS

| | | | |
|---|---|---|---|
| 2005/0252491 A1* | 11/2005 | Oono et al. | 123/447 |
| 2006/0005811 A1* | 1/2006 | Hartmann | 123/406.47 |
| 2006/0231068 A1* | 10/2006 | Weiss et al. | 123/325 |
| 2007/0131196 A1* | 6/2007 | Gibson et al. | 123/198 F |
| 2007/0290581 A1* | 12/2007 | Burnett et al. | 310/49 R |
| 2008/0156300 A1* | 7/2008 | Baumann et al. | 123/481 |
| 2009/0118977 A1* | 5/2009 | Whitney et al. | 701/103 |
| 2009/0248278 A1* | 10/2009 | Nakasaka | 701/103 |

FOREIGN PATENT DOCUMENTS

| | | |
|---|---|---|
| JP | 2004300994 | 10/2004 |
| JP | 2006249998 A | 9/2006 |
| JP | 2007015653 | 1/2007 |
| JP | 2007023793 | 2/2007 |
| JP | 2007162606 | 6/2007 |

\* cited by examiner

MULTICYLINDER ENGINE AND METHOD FOR CONTROLLING THE SAME

INCORPORATION BY REFERENCE

The disclosure of Japanese Patent Application No. 2008-077900 filed on Mar. 25, 2008 including the specification, drawings and abstract is incorporated herein by reference in its entirety.

BACKGROUND OF THE INVENTION

1. Field of the Invention

The invention relates to a multicylinder engine in which part of cylinders may be deactivated, and a method for controlling the same.

2. Description of the Related Art

Multicylinder engines of this type are described in, for example, Japanese Patent Application Publication No. 07-217461 (JP-A-07-217461), Japanese Patent Application Publication No. 2004-300994 (JP-A-2004-300994), Japanese Patent Application Publication No. 2007-15653 (JP-A-2007-15653), Japanese Patent Application Publication No. 2007-23793 (JP-A-2007-23793), and Japanese Patent Application Publication No. 2007-162606 (JP-A-2007-162606). In this type of engine, the vibration developmental state differs between normal engine operation and cylinder deactivation. Therefore, measures need to be taken to control vibration and noise. JP-A-07-217461 and JP-A-2007-15653 suggest the following measures. According to JP-A-07-217461, the characteristics of a mount that supports the engine are made different between normal engine operation and cylinder deactivation. According to JP-A-2007-15653, the vibration developmental state is estimated based on the angular acceleration of a crankshaft, and the operation of an actuator provided in an active vibration-proofing support member that supports the engine is controlled based on the estimated vibration developmental state.

Ignition/combustion may take place in operating cylinders at uneven intervals in some cylinder deactivation modes (e.g. in virtual V-four engine operation mode in which two cylinders are deactivated in a V-six engine). In this case, the output torque may vary between the operating cylinders, which are immediately subsequent to deactivated cylinders in the firing order, and the other operating cylinders (refer to "problems to be solved by the invention" in JP-A-2007-162606). Therefore, during cylinder deactivation where combustion takes place in the operating cylinders at uneven intervals, vibration and noise may increase.

Accordingly, the above-described active vibration-proofing support member may be used to suppress vibration and noise. However, the actual vibration developmental state is complicated by the above-described output torque variation among the operating cylinders. Accordingly, it is difficult to accurately estimate the vibration developmental state. If the active vibration-proofing support member is controlled based on the result of inaccurate estimation of the vibration developmental state, vibration and noise are not suppressed at a sufficient level. Instead, vibration and noise may increase.

SUMMARY OF THE INVENTION

The invention provides a multicylinder engine and a method for controlling the multicylinder engine with which vibration and noise are more effectively suppressed during cylinder deactivation where combustion takes place in operating cylinders at uneven intervals.

A first aspect of the invention relates to a multicylinder engine in which part of cylinders may be deactivated. The multicylinder engine includes a control unit that controls multiple operating cylinders to smooth output torque of the operating cylinders when ignition takes place in the operating cylinders at uneven intervals during cylinder deactivation. The control unit may be an ignition timing adjustment unit that adjusts ignition timing in each of the operating cylinders to smooth the output torque of the operating cylinders. The control unit may be a fuel injection adjustment unit that adjusts a manner for injecting fuel into each of the operating cylinders to smooth the output torque of the operating cylinders. The multicylinder engine according to the first aspect of the invention may further include an active mount. The active mount elastically supports a main body of the multicylinder engine, and generates vibration which cancels vibration that is generated during an operation of the multicylinder engine.

A second aspect of the invention relates to a method for controlling a multicylinder engine in which part of cylinders may be deactivated. According to the method, multiple operating cylinders are controlled to smooth output torque of the operating cylinders when ignition takes place in the operating cylinders at uneven intervals during cylinder deactivation.

According to the aspects of the invention described above, it is possible to smooth the output torque of the multiple operating cylinders during cylinder deactivation where combustion takes place in the operating cylinders at uneven intervals. Thus, generation of complicated vibration due to output torque variation is suppressed. As a result, it is possible to more effectively suppress vibration and noise with the use of the active mount.

BRIEF DESCRIPTION OF THE DRAWINGS

The foregoing and further features and advantages of the invention will become apparent from the following description of example embodiments with reference to the accompanying drawings, wherein the same or corresponding portions will be denoted by the same reference numerals and wherein.

DETAILED DESCRIPTION OF THE EXAMPLE EMBODIMENTS

Hereafter, example embodiments of the invention will be described with reference to the accompanying drawings.

Figure 1:
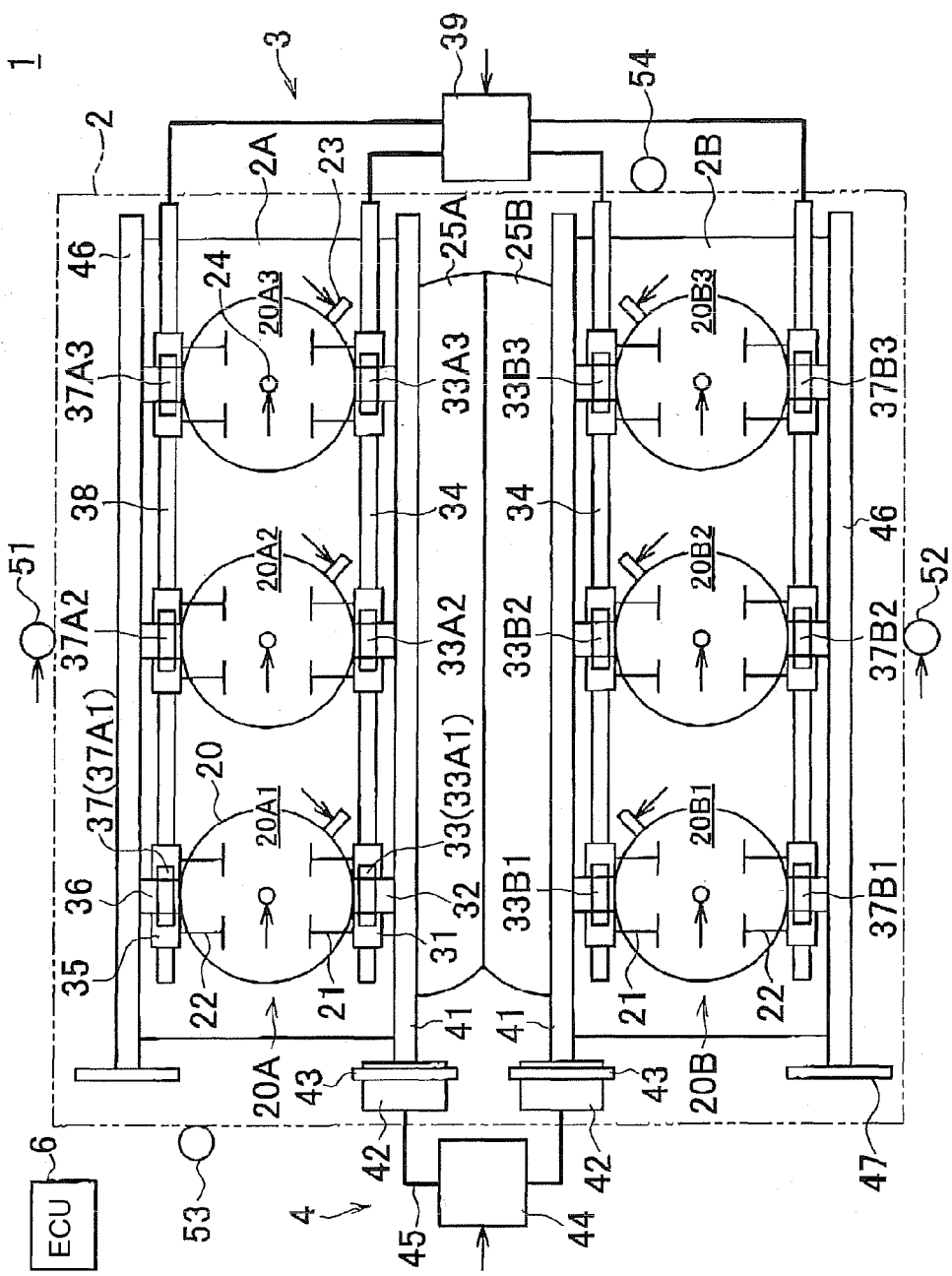
FIG. 1 is a view schematically showing the structure of a four-cycle V-six reciprocating engine according to embodiments of the invention.

FIG. 1 is a view schematically showing the structure of a four-cycle V-six reciprocating engine 1 (hereinafter, referred to as "engine 1") according to the embodiments of the invention. The engine 1 is configured in such a manner that the number of operating cylinders may be changed based on the operation condition (operation performed by a driver) and the operating state (e.g. vehicle speed and engine speed). As shown in FIG. 1, the engine 1 includes an engine block 2 (including a first bank 2A and a second bank 2B), a valve stop setting unit 3, a valve drive unit 4, an engine mount 5, and an engine electronic control unit 6 (hereinafter, referred to as "ECU 6").

In the engine block 2 that forms a main body of the engine 1, the first bank 2A and the second bank 2B are arranged in a V-shape in a lateral view. The first bank 2A and the second bank 2B each have three cylinders 20.

The first bank 2A has a first bank cylinder group 20A. The first bank cylinder group 20A includes a cylinder 20A1 (hereinafter, referred to as "cylinder A1"), a cylinder 20A2 (hereinafter, referred to as "cylinder A2), and a cylinder 20A3 (hereinafter, referred to as "cylinder A3"). The cylinders A1, A2 and A3 extend parallel to each other. In addition, the cylinders A1, A2 and A3 are aligned in the cylinder arranging direction (lateral direction in FIG. 1).

The second bank 2B has a second bank cylinder group 20B. The second bank cylinder group 20B includes a cylinder 20B1 (hereinafter, referred to as "cylinder B1"), a cylinder 20B2 (hereinafter, referred to as "cylinder B2"), and a cylinder 20B3 (hereinafter, referred to as "cylinder B3"). The cylinders B1, B2 and B3 extend parallel to each other. In addition, the cylinders B1, B2 and B3 are aligned in the cylinder arranging direction.

Each cylinder 20 is provided with an intake valve 21, an exhaust valve 22, an injector 23, and a spark plug 24. The intake valves 21 open and close intake ports (not shown). The intake ports for the cylinders A1 to A3 are connected to an intake manifold 25A that is shared by the cylinders A1 to A3. Similarly, the intake ports for the cylinders B1 to B3 are connected to an intake manifold 25B that is shared by the cylinders B1 to B3. The intake manifold 25A and the intake manifold 25B are connected to each other at end portions on the upstream side in the direction in which the intake air flows.

The engine 1 according to the embodiments of the invention is operated in one of 1) normal engine operation mode in which all the cylinders are operated and fuel injection/firing order is A1-B2-A3-B3-A2-B1; 2) four-cylinder operation mode in which the cylinder A1 and the cylinder B3 are deactivated in the above-described firing order; 3) three-cylinder operation mode in which the first bank cylinder group 20A and the second bank cylinder group 20B are alternately deactivated when the engine 1 is placed in the three-cylinder operation mode; and 4) two-cylinder operation mode in which the cylinder A1 and the cylinder B3 are operated and the other cylinders are deactivated in the above-described firing order.

The valve stop setting unit 3 according to the embodiments of the invention is structured as follows to stop the operations of the intake valves 21 and the exhaust valves 22 for the deactivated cylinders (to keep the intake valves 21 and the exhaust valves 22 for the deactivated cylinders closed) based on the number of operating cylinders that is determined by the ECU 6.

The intake valve 21 for each cylinder 20 is provided with an intake main rocker arm 31, an intake sub-rocker arm 32, and an intake-side connection-state switching portion 33. The intake main rocker arms 31, the intake sub-rocker arms 32 and the intake-side connection-state switching portions 33 are fitted to intake rocker shafts 34.

The intake main rocker arms 31 are pivotally supported by the intake rocker shafts 34. When the intake main rocker arm 31 pushes the intake valve 21 downward, the intake port is opened. On the other hand, when intake main rocker arm 31 pulls the intake valve 21 upward, the intake port is closed. The intake sub-rocker arms 32 are pivotally supported by the intake rocker shafts 34, and pivot in accordance with the rotation of cams (not shown) fitted on intake camshafts 41, described later in detail.

The intake-side connection-state switching portion 33 connects the intake main rocker arm 31 and the intake sub-rocker arm 32 to each other or disconnects the intake main rocker arm 31 and the intake sub-rocker arm 32 from each other based on the manner of supplying hydraulic pressure. The cylinders A1, A2, A3, B1, B2 and B3 are provided with intake-side connection-state switching portions 33A, 33A2, 33A3 33B1, 33B2, and 33B3, respectively. Oil passages through which hydraulic pressure is supplied to the intake-side connection-state switching portions 33 are formed in the intake rocker shafts 34.

Similarly, the exhaust valve 22 for each cylinder 20 is provided with an exhaust main rocker arm 35, an exhaust sub-rocker arm 36, and an exhaust-side connection-state switching portion 37. The exhaust main rocker arms 35, the exhaust sub-rocker arms 36 and the exhaust-side connection-state switching portions 37 are fitted to exhaust rocker shafts 38. The cylinders A1, A2, A3, B1, B2 and B3 are provided with exhaust-side connection-state switching portions 37A1, 37A2, 37A3, 37B1, 37B2, and 37B3, respectively.

The above-described oil passages formed in the intake rocker shafts 34 and the exhaust rocker shafts 38 are connected to a hydraulic pressure control unit 39. The hydraulic pressure control unit 39 controls the manner of supplying hydraulic pressure to the intake-side connection-state switching portions 33A1 to 33B3 and the exhaust-side connection-state switching portions 37A1 to 37B3.

Because the detailed structure of each element in the valve stop setting unit 3 is known (refer to, for example, JP-A-05-248216 and JP-A-2007-162606), the description thereof will not be provided in this specification.

The valve drive unit 4 drives (opens and closes) the intake valves 21 and the exhaust valves 22 for the operating cylinders. The valve drive unit 4 advances or retards the opening timing and closing timing of the intake valves 21. More specifically, the valve drive unit 4 includes, in addition to the intake camshafts 41, valve timing controllers 42, intake timing gears 43, a hydraulic pressure control unit 44, oil passages 45, exhaust camshafts 46 and exhaust timing gears 47.

One end portions of the intake camshafts 41 are connected to the respective valve timing controllers 42. Each valve timing controller 42 includes a cylindrical housing that has the central axis which coincides with the central axis of the intake camshaft 41. The valve timing controllers 42 rotate the intake camshafts 41 relative to the housings based on the manner of supplying hydraulic pressure, thereby continuously changing the valve timing within a predetermined valve timing range. The intake timing gears 43 are fixed to the housings of the valve timing controllers 42.

The paired valve timing controllers 42 are connected to the hydraulic pressure control unit 44 via the respective oil passages 45. The hydraulic pressure control unit 44 controls the manner of supplying hydraulic pressure to the valve timing controllers 42 based on the valve timing that is determined by the ECU 6, thereby advancing or retarding the opening timing and the closing timing of the intake valves 21. Because the detailed structures of the valve timing controllers 42 and the hydraulic pressure control unit 44 are known, the description thereof will not be provided in this specification.

The exhaust timing gears 47 are fixed to the one end portions of the respective exhaust camshafts 46. The intake timing gears 43 and the exhaust timing gears 47 are connected to a crankshaft (not shown) via a connection mechanism, for example, a chain. With this structure, the intake liming gears 43 and the exhaust timing gears 47 are rotated in synchronization with the rotation of the crankshaft.

The engine mount 5 supports the engine block 2. The engine mount 5 includes a first mount 51, a second mount 52, a third mount 53, and a fourth mount 54.

The first mount 51 and the second mount 52 are arranged in such a manner that a virtual line, which extends between the first mount 51 and the second mount 52, is substantially perpendicular to the cylinder arranging direction. Each of the first mount 51 and the second mount 52 is a so-called active mount that includes an elastic support member and an electric actuator. The first mount 51 and the second mount 52 elastically support the engine block 2, and generate vibration that cancels the vibration which is generated in the engine block 2 during the operation of the engine 1, that is, the vibration that is opposite in phase to the vibration that is generated in the engine block 2 during the operation of the engine 1. The third mount 53 and the fourth mount 54 are arranged in such a manner that a virtual line, which extends between the third mount 53 and the fourth mount 54, extends along the cylinder arranging direction. Each of the third mount 53 and the fourth mount 54 is a regular engine mount, and elastically supports the engine block 2.

The ECU 6 serves as an ignition timing adjustment unit and a fuel injection adjustment unit according to the invention. The ECU 6 is connected to the injectors 23, the spark plugs 24, the hydraulic pressure control unit 39, the hydraulic pressure control unit 44, the first mount 51, the second mount 52, etc. to control these elements.

More specifically, the ECU 6 controls the elements in the engine 1 so that the engine 1 is operated in the normal engine operation mode or one of the three cylinder deactivation modes described above. In the normal engine operation mode, fuel injection and ignition are performed in the order of A1-B2-A3-B3-A2-B1. In the cylinder deactivation modes, fuel injection and ignition are stopped in the deactivated cylinders and the operations of the intake valves 21 and the exhaust valves 22 for the deactivated cylinders are stopped. The ECU 6 controls the operation of the hydraulic control unit 44 to continuously adjust the opening timing and the closing timing of the intake valves 21.

In the four-cylinder operation mode in which ignition/combustion takes place in the operating cylinders at uneven intervals, the ECU 6 according to the embodiments of the invention adjusts the ignition timing and the fuel injection manner in the operating cylinders as required to smooth the output torque of the operating cylinders.

Next, the control over the engine 1 according to the embodiments of the invention will be briefly described.

The ECU 6 determines the number of operating cylinders based on the operation condition and the operating state of the engine 1. The ECU 6 controls the hydraulic pressure control unit 39 based on the number of operating cylinders to stop the operations of the intake valves 21 and the exhaust valves 22 for the deactivated cylinders and permit the operations of the intake valves 21 and the exhaust valves 22 for the operating cylinders. The ECU 6 controls the operations of various elements such as the injectors 23, the spark plugs 24, and the valve timing controllers 42 based on the operation condition and the operating state of the engine 1 and the number of operating cylinders. The ECU 6 estimates the vibration developmental state in the engine block 2 based on the angular acceleration of the crankshaft (not shown), and controls the operations of the first mount 51 and the second mount 52 based on the estimation result.

In the normal engine operation mode, the three-cylinder operation mode, and the two-cylinder operation mode, ignition/combustion takes place in the operating cylinders at even intervals. In these modes, it is relatively easy to estimate the vibration developmental state. Therefore, it is possible to actively control vibration and noise with the use of the first mount 51 and the second mount 52 effectively.

In the four-cylinder operation mode, ignition/combustion takes place in the operating cylinders at uneven intervals. In addition, in the four-cylinder operation mode, the output torque varies among the cylinders for the following reason.

In the case of the cylinder B2, which is immediately subsequent to the deactivated cylinder A1 in the firing order, no power is generated by combustion in the cylinder A1, which is immediately preceding the cylinder B2 in the firing order. Therefore, the output torque of the cylinder B2 is lower than normal due to inertia of the crankshaft. In the case of the cylinder A3, which is immediately subsequent to the cylinder B2 in the firing order, the crankshaft has been accelerated due to the combustion in the cylinder B2, which is immediately preceding the cylinder A3 in the firing order. Therefore, the output torque of the cylinder A3 is not decreased unlike the case of the cylinder B2. Similarly, the output torque of the cylinder A2, which is immediately subsequent to the deactivated cylinder B3 in the firing order, is lower than normal, whereas the output torque of the cylinder B1, which is immediately subsequent to the cylinder A2 in the firing order, is not decreased.

The pressure in an intake pipe in the first bank 2A is kept high because the intake valve 21 for the cylinder A1 remains closed when the cylinder A1 is deactivated. Therefore, the amount of air taken into the cylinder A3 is greater than normal. The cylinder A3 is the operating cylinder that is immediately subsequent to the deactivated cylinder A1 in the firing order, among the cylinders that belong to the same bank as the deactivated cylinder A1 and that are connected to the intake manifold 25A. Thus, the output torque of the cylinder A3 is higher than normal. Similarly, due to deactivation of the cylinder B3, the amount of air taken into the cylinder B1 is greater and the output torque of the cylinder B1 is higher than normal.

The conditions of output torque of the cylinders A1 to B3 are as follows: A1 (deactivated)—B2 (torque decrease)—A3 (torque increase)—B3 (deactivated)—A2 (torque decrease)—B1 (torque increase). That is, great and complicated torque variation among the cylinders occurs.

Therefore, according to the embodiments of the invention, in the cylinder B1 and the cylinder A3, the ignition timing is retarded (within an ignition timing range in which the combustion state does not deteriorate) or the fuel injection amount is decreased (within an intake air amount range in which the combustion state does not deteriorate), whereby an increase in the torque due to an increase in the intake air amount is offset (the output torque is decreased so that the output torque coincides with an average torque). In the cylinder B2 and the cylinder A2, the ignition timing is advanced (within the ignition timing range in which the combustion state does not deteriorate) or the fuel injection amount is increased (within the intake air amount range in which the combustion state does not deteriorate), whereby it is possible to offset a decrease in the torque due to deactivation of the cylinder A1 and the cylinder B3, which are immediately preceding the cylinder B2 and the cylinder A2, respectively, in the firing order (the output torque is increased so that the output torque coincides with the average torque).

Next, examples of the control over the engine 1 according to the embodiments of the invention will be described with reference to flowcharts. Note that in the description concerning the flowcharts and the drawing showing the flowcharts, "step" is simply referred to as "S".

Figure 2:
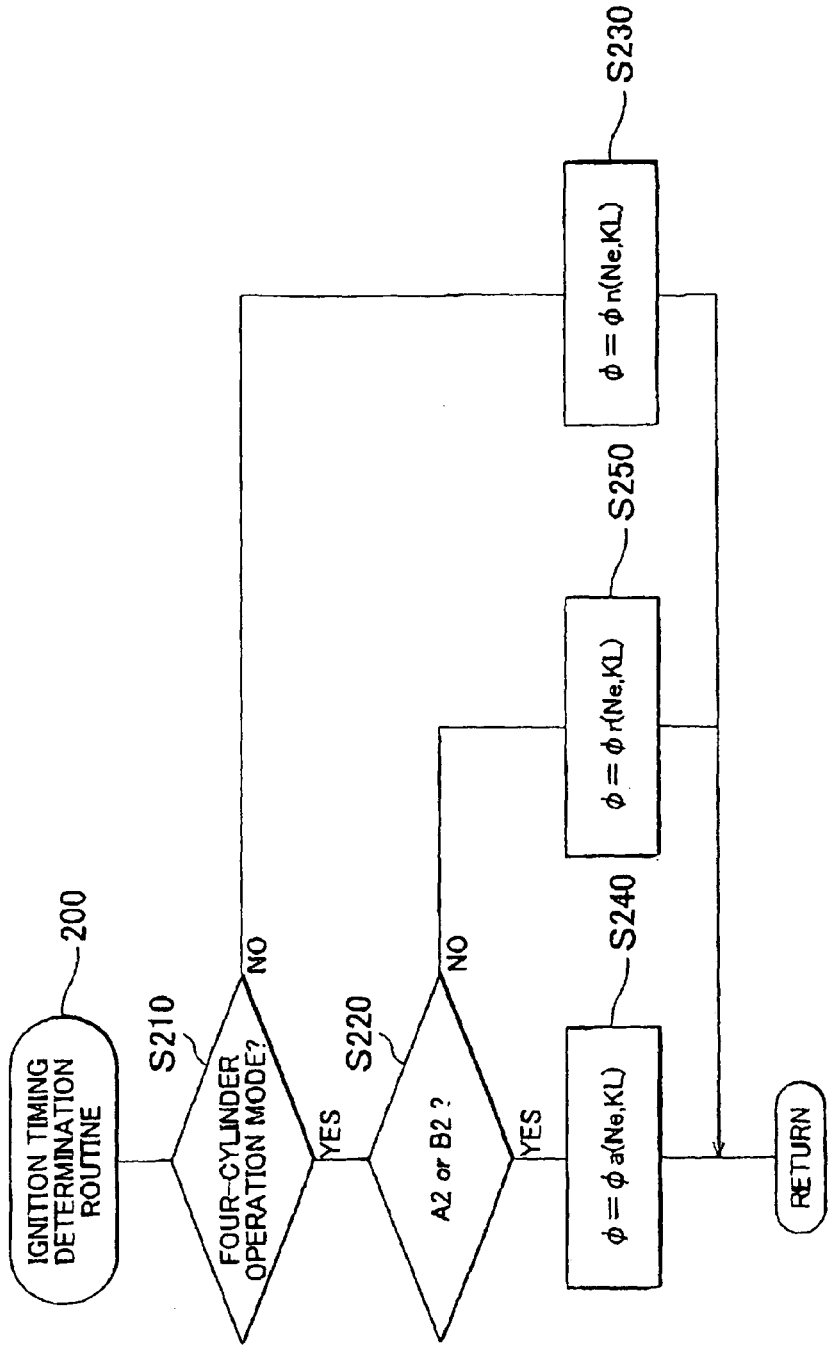
FIG. 2 is a flowchart showing an example of an ignition timing determination routine executed by an ECU shown in FIG. 1.

Hereafter, a first embodiment of the invention will be described with reference to FIG. 2. FIG. 2 is a flowchart showing an example of an ignition timing determination routine 200 executed by the ECU 6 shown in FIG. 1. The ECU 6 periodically executes the routine 200 each time the crank angle reaches a predetermined value (e.g. BTDC 90° CA).

In the routine, it is first determined in S210 whether the current engine operation mode is the four-cylinder operation mode. If it is determined that the current engine operation mode is the four-cylinder operation mode ("YES" in S210), S220 is executed. In S220, it is determined whether the current ignition takes place in one of the cylinder A2 and the cylinder B2. Based on the results of determinations in S210 and S220, ignition timing φ is determined as described below (S230, S240 or S250), after which the routine ends.

If it is determined that the current engine operation mode is one of the modes in which combustion takes place in the operating cylinders at even intervals, that is, the modes other than the four-cylinder operation mode ("NO" in S210), S230 is executed. In S230, the ignition timing φ is determined based on a regular map φn and parameters such as an engine speed Ne and a load factor KL.

If it is determined that current ignition takes place in one of the cylinder A2 and the cylinder B2 in the four-cylinder operation mode ("YES" in S210 and "YES" in S220), S240 is executed. In S240, the ignition timing φ is determined with the use of a map φa based on which the ignition timing is advanced than normal. In this way, the output torque is higher than the normal (increased as much as possible) so that the output torque approaches the average torque.

If it is determined that current ignition takes place in one of the cylinder B1 and the cylinder A3 in the four-cylinder operation mode ("YES" in S210 and "NO" in S220), S250 is executed. In S250, the ignition timing φ is determined with the use of a map φr based on which the ignition timing is retarded than normal. In this way, the output torque is lower than the normal (decreased as much as possible) so that the output torque approaches the average torque.

Figure 3:
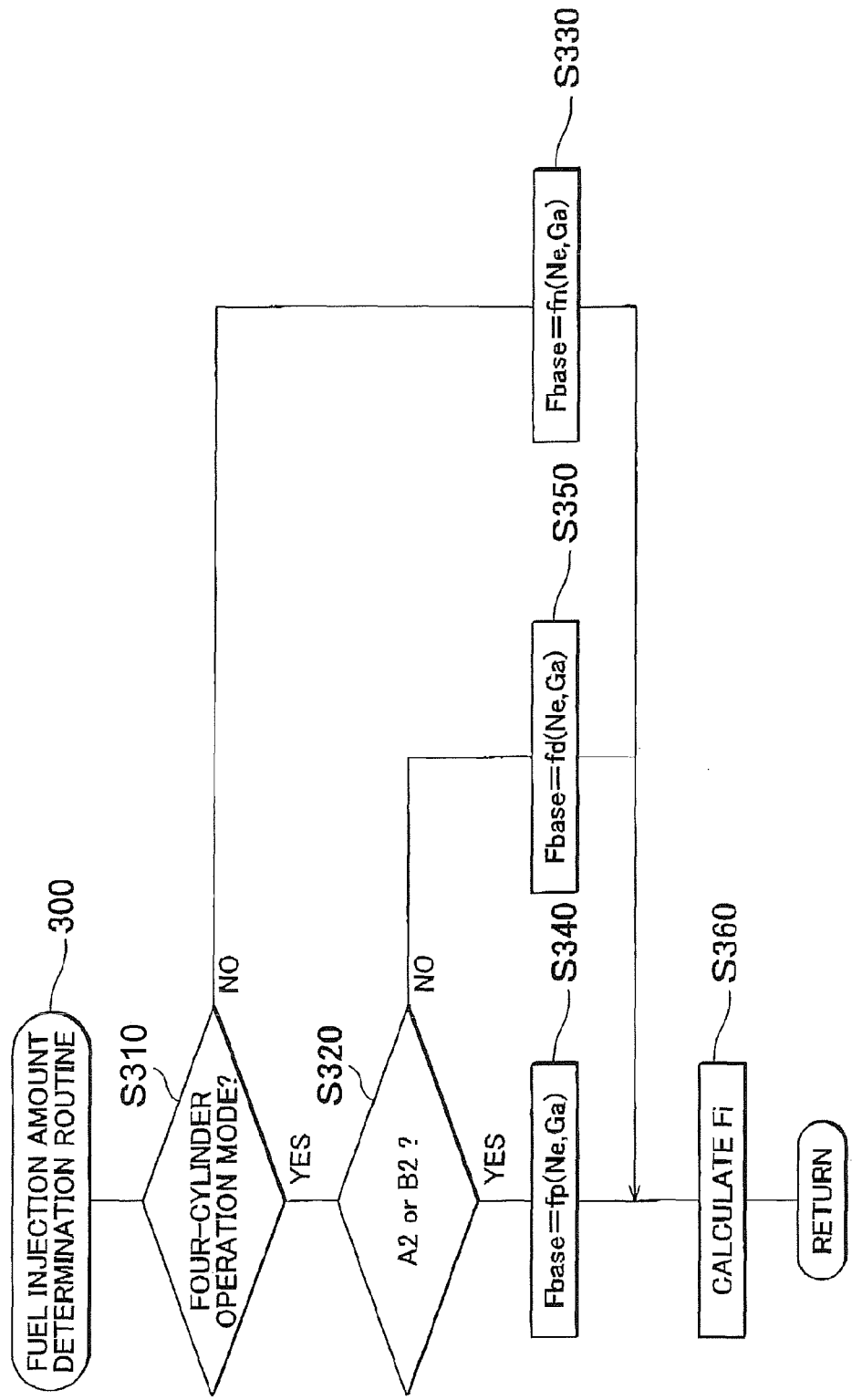
FIG. 3 is a flowchart showing an example of a fuel injection amount determination routine executed by the ECU shown in FIG. 1.

Hereafter, a second embodiment of the invention will be described with reference to FIG. 3. FIG. 3 is a flowchart showing a fuel injection amount determination routine 300 that is executed by the ECU 6 shown in FIG. 1. The ECU 6 periodically executes the routine 300 each time the crank angle reaches a predetermined value.

In the routine, it is first determined in S310 whether the current engine operation mode is the four-cylinder operation mode. If it is determined that the current engine operation mode is the four-cylinder operation mode ("YES" in S310), S320 is executed. In S320, it is determined whether current fuel injection takes place in one of the cylinder A2 and the cylinder B2. Based on the results of determinations in S310 and S320, a based fuel injection amount Fbase is determined as follows (S330, S340 or S350). Then, the fuel injection amount is corrected based on an output from, for example, an air-fuel ratio sensor, whereby a command fuel injection amount Fi is calculated (S360), after which the routine ends.

If it is determined that the current engine operation mode is one of the modes in which combustion takes place in the operating cylinders at even intervals, that is, the modes other than the four-cylinder operation mode ("NO" in S310), S330 is executed. In S330, the base fuel injection amount Fbase is determined based on a regular map fn, and an intake air flow rate Ga that is determined based on the engine speed Ne and an output from the air-flow meter.

If it is determined that current ignition takes place in one of the cylinder A2 and the cylinder B2 in the four-cylinder operation mode ("YES" in S310 and "YES" in S320), S340 is executed. In S340, the base fuel injection amount Fbase is determined with the use of a map fp based on which the fuel injection amount is greater than normal. In this way, the output torque is higher than the normal (increased as much as possible) so that the output torque approaches the average torque.

If it is determined that current ignition takes place in one of the cylinder B1 and the cylinder A3 in the four-cylinder operation mode ("YES" in S310 and "NO" in S320), S350 is executed. In S350, the base fuel injection amount Fbase is determined with the use of a map fd based on which the fuel injection amount is smaller than normal. In this way, the output torque is lower than the normal (decreased as much as possible) so that the output torque approaches the average torque.

In the engine 1 according to the embodiments of the invention, pumping loss is reduced effectively because the operations of the intake valves 21 and the exhaust valves 22 for the deactivated cylinders are stopped. As a result, it is possible to obtain appropriate fuel efficiency characteristics.

In the engine 1 according to the embodiments of the invention, the cylinders that are operated in the four-cylinder operation mode are deactivated in the two-cylinder operation mode, whereas the cylinders that are deactivated in the four-cylinder operation mode are operated in the two-cylinder operation mode. That is, the deactivated cylinders and the operating cylinders are switched between the two-cylinder operation mode and the four-cylinder operation mode. Therefore, it is possible to prevent, as much as possible, occurrence of the situation in which certain cylinders are continuously operated for a long time or certain cylinders remain deactivated for a long time. Therefore, it is possible to perform heat management in an appropriate manner.

In the engine 1 according to the embodiments of the invention, the cylinder A3 and the cylinder B1, which are diagonally opposite to each other, are deactivated in the four-cylinder operation mode, and operated in the two-cylinder operation mode. Therefore, the symmetry relationship among the operating cylinders is ensured, and combustion takes place in the operating cylinders at even intervals in the two-cylinder operation mode. Accordingly, it is possible to suppress occurrence of vibration and noise in the four-cylinder operation mode and the two-cylinder operation mode as much as possible. In addition, the symmetry relationship among heat generation portions is ensured as much as possible. As a result, it is possible to perform heat management in a more appropriate manner.

In the engine 1 according to the embodiments of the invention, in the four-cylinder operation mode in which combustion takes place in the operating cylinders at uneven intervals, for example, the ignition timing is adjusted. Thus, it is possible to smooth the output torque of the operating cylinders A2, A3, B1 and B2. Thus, it is possible to effectively suppress vibration and noise. In addition, because generation of complicated vibration due to torque variation is suppressed, the ECU 6 accurately estimates the vibration developmental state. Accordingly, the first mount 51 and the second mount 52 suppress vibration and noise more effectively.

Modifications of the embodiments of the invention will be described below.

The mechanical structures of multicylinder engines to which the invention is applied are not particularly limited.

For example, the invention may be applied to various types of engines such as gasoline engines, diesel engines, methanol engines, and bioethanol engines. The number of cylinders and the manner of arranging the cylinders are not particularly limited (the invention may be applied to various types of engines such as in-line engines, V-engines, horizontal opposed engines). The fuel injection manners (direct-injection, port-injection, and dual injection where direct-injection and port-injection may be performed) are not particularly limited. The invention may be applied to the engines in which fuel is supplied by a carburetor instead of an injector.

The V-six engine 1 according to the embodiments of the invention may be configured so as to be operated in an engine operation mode selected from the normal engine operation mode, the four-cylinder operation mode and the three-cylinder operation mode in which the cylinders in only one of the banks are deactivated. In this case, to drive the intake valves 21 and the exhaust valves 22 for the constantly operating two cylinders (e.g. cylinder B1 and cylinder B2), the rocker arms are constantly pivoted by the rotation of the cams provided on the intake camshaft 41 and the exhaust camshaft 46. That is, in this case, for the constantly operating two cylinders, a simple structure is employed in which sub-rocker arms and connection-state switching portions are not provided and the rocker arms are pivoted by the camshafts.

The exhaust camshafts 46 may be provided with the valve timing controllers 42. That is, the valve timing of the exhaust valves 22 may be continuously changed.

Instead of or in addition to the first mount 51 and the second mount 52, the third mount 53 and the fourth mount 54 may be active mounts. Alternatively, one of the first mount 51 and the second mount 52 and one of the third mount 53 and the fourth mount 54 may be active mounts.

The control methods according to the invention are not limited to those in the embodiments described above.

For example, the first embodiment and the second embodiment may be implemented at the same time. Alternatively, one of the first embodiment and the second embodiment may be implemented.

In the embodiments of the invention, only the control for decreasing the output torque of the cylinder A3 and the cylinder B1 may be executed. That is, for example, the same control may be executed in S230 and S240, namely, the ignition timing φ is determined based on the regular map φn in both S230 and S240.

In the second embodiment of the invention, in order to smooth the output torque, instead of the base fuel injection amount Fbase, a correction value for the base fuel injection amount Fbase may be adjusted. Instead of Or in addition to the fuel injection amount, the fuel injection timing may be adjusted.

The firing order is not limited to that in the embodiments of the invention. More specifically, the firing order may be B1-A1-B2-A2-B3-A3. In this case, in the four-cylinder operation mode (cylinder A1 and cylinder B3 are deactivated), control for suppressing output torque of the cylinder B1 and the cylinder A2 or control for increasing the output torque of the cylinder B2 and the cylinder A3 may be executed.

If the engine 1 has a certain configuration, the amount of air taken into the operating cylinders, which are immediately subsequent to the deactivation cylinders in the firing order, may be increased, unlike the case described in the embodiments of the invention. That is, the manner of torque variation may vary depending on the structure of the engine 1. Therefore, control for smoothing the output torque may be executed as required based on the configuration of the engine 1 and the manner of torque variation.

The valve timing or the valve lift may be controlled to smooth the amounts of air taken into the cylinders. The valve control for smoothing the amounts of air taken into the cylinders and the above-described control for adjusting the ignition timing may be executed in combination.

While the invention has been described with reference to example embodiments thereof, it is to be understood that the invention is not limited to the example embodiments or constructions. To the contrary, the invention is intended to cover various modifications and equivalent arrangements. In addition, while the various elements of the example embodiments are shown in various combinations and configurations, which are exemplary, other combinations and configurations, including more, less or only a single element, are also within the spirit and scope of the invention.

What is claimed is:

1. A plurality of cylinders operable in a normal mode in which all of the cylinders are operating and a partially deactivated mode in which at least one of the cylinders is deactivated and the remaining cylinders are operating cylinders, and wherein ignition takes place in the operating cylinders at uneven intervals according to a firing order in the partially deactivated mode; and
    a control unit configured to increase an output torque of an immediately subsequent operating cylinder after the at least one deactivated cylinder in the firing order, the increased output torque maintained to be greater than an output torque of any other operating cylinder during the partially deactivated mode, in order to smooth the output torque of the operating cylinders in the partially deactivated mode.

2. The multicylinder engine according to claim 1, wherein the control unit is an ignition timing adjustment unit that adjusts ignition timing in each of the operating cylinders to smooth the output torque of the operating cylinders.

3. The multicylinder engine according to claim 1, wherein the control unit is a fuel injection adjustment unit that adjusts a manner for injecting fuel into each of the operating cylinders to smooth the output torque of the operating cylinders.

4. The multicylinder engine according to claim 3, wherein the output torque of the immediately preceding operating cylinder before the at least one deactivated cylinder in the firing order is decreased to smooth the output torque of the operating cylinders.

5. The multicylinder engine according to claim 2, wherein the output torque of the immediately preceding operating cylinder before the at least one deactivated cylinder in the firing order is decreased to smooth the output torque of the operating cylinders.

6. The multicylinder engine according to claim 1, wherein said multicylinder engine is a V-six engine having six cylinders, and wherein said partially deactivated mode includes a four-cylinder operation mode and a two-cylinder operation mode, the four-cylinder operation mode having two predetermined cylinders diagonally opposite from each other are deactivated, and the two predetermined cylinders are operating cylinders in the two-cylinder mode.

7. The multicylinder engine according to claim 1, further comprising:
    an active mount that elastically supports a main body of the multicylinder engine, and wherein the control unit estimates a vibrational development state, and the active mount generates vibrations based on the estimated vibrational development state to cancel vibrations generated during an operation of the multicylinder engine.

8. A method for controlling a multicylinder engine having a plurality of cylinders operable in a normal mode in which all of the cylinders are operating and a partially deactivated mode in which at least one of the cylinders is deactivated and the remaining cylinders are operating cylinders, said method comprising:

increasing an output torque of an immediately subsequent operating cylinder after a deactivated cylinder in a firing order undergoing ignition at uneven intervals, the increased output torque is maintained to be greater than an output torque of any other operating cylinder during the partially deactivated mode, in order to smooth the output torque of the operating cylinders.

9. The method according to claim 8, wherein ignition timing in each of the multiple operating cylinders is adjusted to smooth the output torque of the operating cylinders.

10. The method according to claim 8, wherein a manner for injecting fuel into each of the multiple operating cylinders is adjusted to smooth the output torque of the operating cylinders.

11. The method according to claim 10, wherein the output torque of the immediately preceding operating cylinder before the deactivated cylinder in the firing order is decreased to smooth the output torque of the operating cylinders.

12. The method according to claim 9, wherein the output torque of the immediately preceding operating cylinder before the deactivated cylinder in the firing order is decreased to smooth the output torque of the operating cylinders.

\* \* \* \* \*